(12) United States Patent
Cong

(10) Patent No.: US 8,534,059 B2
(45) Date of Patent: Sep. 17, 2013

(54) PRESSURE REDUCING GAS STORAGE DEVICE, AIR-JET SYSTEM, AND MOTOR VEHICLE

(76) Inventor: Yang Cong, Guangdong (CN)

( * ) Notice: Subject to any disclaimer, the term of this patent is extended or adjusted under 35 U.S.C. 154(b) by 32 days.

(21) Appl. No.: 13/285,513

(22) Filed: Oct. 31, 2011

(65) Prior Publication Data

US 2012/0111531 A1    May 10, 2012

Related U.S. Application Data

(63) Continuation of application No. PCT/CN2010/072399, filed on May 3, 2010.

(30) Foreign Application Priority Data

May 1, 2009 (CN) ............... 2009 1 0107195
May 1, 2009 (CN) ............... 2009 1 0107196

(51) Int. Cl.
*F16D 31/02* (2006.01)

(52) U.S. Cl.
USPC ................... 60/415; 60/407; 60/456

(58) Field of Classification Search
USPC ............... 60/407, 413, 415, 456, 659
See application file for complete search history.

(56) References Cited

U.S. PATENT DOCUMENTS

2006/0081290 A1    4/2006   Sachs
2007/0284155 A1*   12/2007  Cong ..................... 180/2.2

FOREIGN PATENT DOCUMENTS

| CN | 86207843 U | 9/1987 |
| CN | 1052540 A | 6/1991 |
| CN | 2208160 Y | 9/1995 |
| CN | 1236075 A | 11/1999 |
| DE | 2007010210 A | 9/2008 |
| EP | 1267432 A | 12/2002 |

* cited by examiner

*Primary Examiner* — Michael Leslie
(74) *Attorney, Agent, or Firm* — Lathrop & Gage LLP

(57) ABSTRACT

A pressure reducing gas storage device, an air-jet system and a motor vehicle are disclosed herein, wherein the pressure reducing gas storage device comprises a gas storage tank including an inlet for receiving compressed air and an outlet for outputting air and a heat exchanger for heating the air in the air input into the gas storage tank. By providing a heat exchanger to heat the air input in the gas storage tank, the phenomenon of being frozen is eliminated and the pressure reducing gas storage device is able to work continuously and stably.

14 Claims, 16 Drawing Sheets

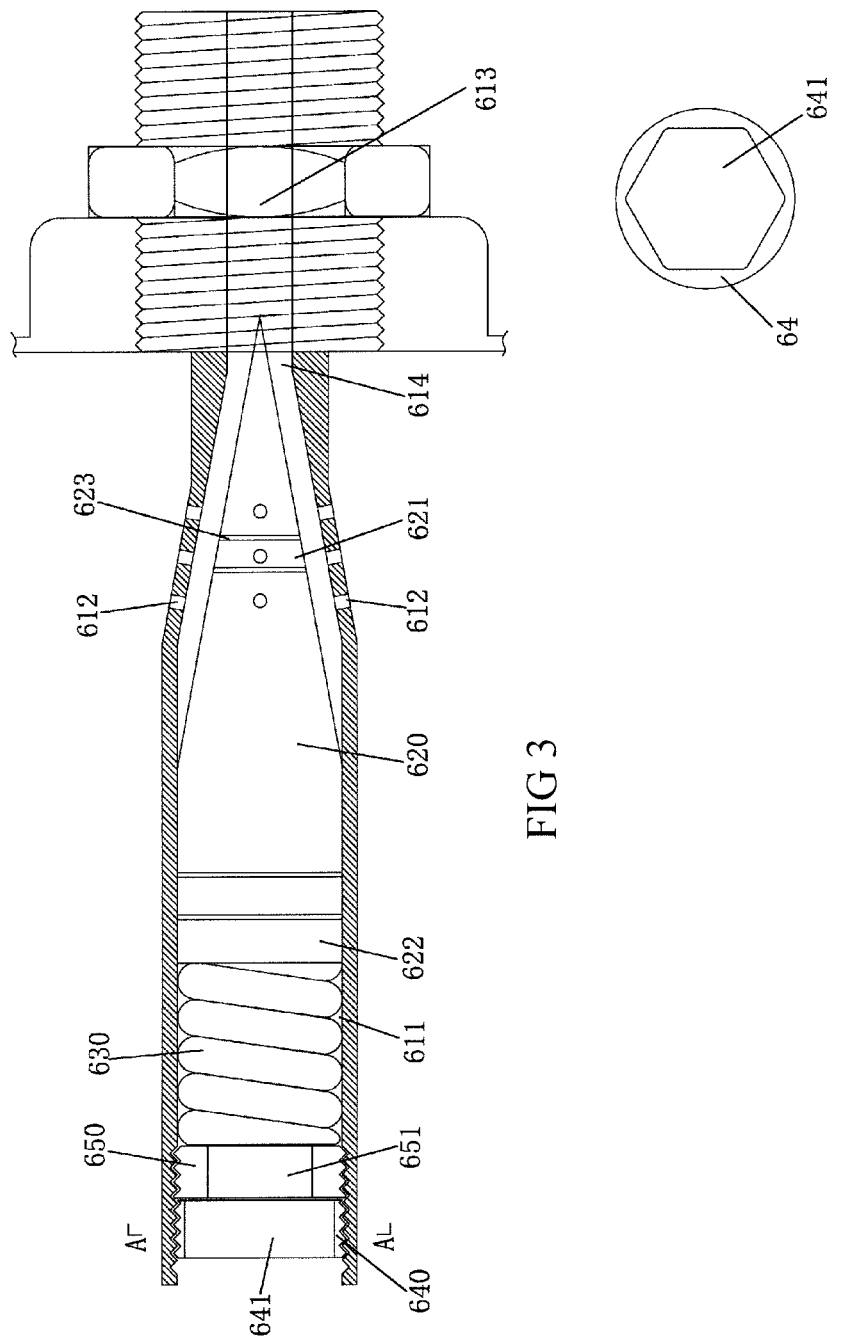

PRESSURE REDUCING GAS STORAGE DEVICE, AIR-JET SYSTEM, AND MOTOR VEHICLE

RELATED APPLICATIONS

This application is a continuation of PCT Patent Application Serial No. PCT/CN2010/072399, filed May 3, 2010, which claims priority to Chinese Patent Application Serial No. 200910107196.3, filed May 1, 2009 and Chinese Patent Application Serial No. 200910107195.9, filed May 1, 2009, the disclosures of which are incorporated herein by reference.

TECHNICAL FIELD

The present application relates to a pressure reducing gas storage device, an air-jet system and a motor vehicle.

BACKGROUND

In order to avoid severe environmental pollution and directly utilize the wind resistance airflow encountered by a motor vehicle during while running, U.S. Pat. No. 7,641,005 B2 issued to the applicant of the present application provides an engine comprising left and right wind-powered pneumatic engines arranged symmetrically. Each of the left and right wind-powered pneumatic engines comprises an impeller chamber as well as impeller and vanes arranged therein. Compressed air is used in the engine as main power, and external wind resistance are received for use as auxiliary power, thereby driving the impellers and vanes to operate to generate power output. The power drives the motor vehicle after it is shifted via a central main power output gearbox.

The above invention firstly proposed a wind-powered pneumatic engine which utilizes high pressure air as the main power and directly utilizes the wind resistance airflow as the auxiliary power, and a motor vehicle in which the need of converting wind resistance airflows into electrical power and the need of a complex mechanic-electric energy conversion system are eliminated, and the structure thereof is simplified. Therefore, a new way to save energy and find a substitute for fuel is provided.

In order to further optimize the performance of the wind-powered pneumatic engine and improve the operating efficiency of the wind-powered pneumatic engine and the motor vehicle, based on the aforementioned application, another U.S. patent application Ser. No. 12/377,513 (WO 2008/022556) filed by the applicant provides a combined wind-powered pneumatic engine. This engine comprises left and right wind resistance engines operating independently and a plurality of first compressed air engines arranged around the left and right wind resistance engines. The left and right wind resistance engines comprise a second impeller and the first compressed air engines comprise a first impeller. The power outputted by the left wind resistance engines and its peripheral first compressed air engines, as well as the power outputted by the right wind resistance engine and its peripheral first compressed air engines, is outputted as main power through a left power output shaft, a right power output shaft, a reversing wheel and gear.

However, the above mentioned wind-powered pneumatic engine and motor vehicle using compressed air as the source of main power are still a new technology. Therefore, there remains a need of further perfection and improvement to the structure of the wind-powered pneumatic engine and the motor vehicle employing the wind-powered pneumatic engine as discussed above. So is particularly in view of power performance.

SUMMARY OF THE INVENTION

The object of the present application is to provide a pressure reducing gas storage device, an air jet system and a motor vehicle which are capable of continuously stable working.

In accordance with an aspect of the present application, a pressure reducing gas storage device comprises a gas storage tank and a heat exchanger. The gas storage tank comprises an inlet for receiving compressed air and an outlet for outputting air. The heat exchanger is used to heat the air in the air input into the gas storage tank.

The pressure reducing gas storage device further comprises a pressure reducing valve. The compressed air enters the gas storage tank after its pressure is reduced by the pressure reducing valve. The heat exchanger comprises a first heat exchange unit filled with a first medium. The first medium exchanges heat with the air in the gas storage tank so as to heat the air. The pressure reducing gas storage device further comprises a cooler and a first circulating pump. The first heat exchange unit, the cooler and the first circulating pump form an inner circulating cooling system. The first medium circulates within the first heat exchange unit and the cooler. The cooler exchanges heat with ambient air. The first heat exchange unit has a first temperature regulation chamber which surrounds the gas storage tank. The first medium is filled between the first temperature regulation chamber and the gas storage tank. The two ends of the cooler are connected to the temperature regulation chamber.

The heat exchanger further comprises a second heat exchange unit. The inlet, the first heat exchange unit, the second heat exchange unit and the outlet are arranged in turn. The second heat exchange unit has a second temperature regulation chamber, a second medium and a heater. The second temperature regulation chamber surrounds the gas storage tank. The second medium is filled between the second temperature regulation chamber and the gas storage tank. The heater is provided on the second temperature regulation chamber and heats the second medium. The second medium exchanges heat with the air in the gas storage tank. The second temperature regulation chamber is connected to a radiator and the second medium circulates within the second temperature regulation chamber and the radiator. The radiator exchanges heat with ambient air.

A motor vehicle refrigeration system comprises a gas storage tank, a pressure reducing valve, a heat exchanger, a cooler and a first circulating pump. The gas storage tank receives compressed air the pressure of which is reduced by a pressure reducing valve. The first heat exchange unit, the cooler and the first circulating pump form an inner circulating cooling system. The first medium circulates within the first heat exchange unit and the cooler. The cooler exchanges heat with ambient air.

A compressed air engine comprises a housing, an impeller body arranged in the housing and an air-jet system. The output of the air-jet nozzle is used to eject compressed air onto the impeller body within the housing.

The pressure reducing valve comprises a housing, a valve core located within the housing, an regulation block and an elastic body. The valve core is sealingly and slidably fitted with the housing. The housing has a housing cavity axially running therethrough and an airway radially running therethrough. The housing cavity is connected to an air intake pipeline by which the housing cavity is connected to the gas storage tank. The valve core has a sealing end and a regulation end and the elastic body is arranged between the regulation block and the regulation end of the valve core. The regulation block is fixed with the housing and the valve core has a first position and a second position. In the first position, the sealing end blocks the air intake pipeline to disconnect the air intake pipeline with the gas storage tank; and in the second position, the sealing end is apart from the air intake pipeline to connect the air intake pipeline with the gas storage tank.

The pressure reducing valve comprises a first control valve and a second valve. The first control valve comprises a first valve seat having a cavity, a first valve plug, a second elastic body, a first gas pipeline, a second gas pipeline, a third pipeline and a fourth pipeline. The first valve plug is arranged in the cavity and divides the cavity into a first chamber and a second chamber. The first valve plug is sealingly and slidably fitted with the first valve seat. The second elastic body is arranged in the second chamber and supports the first valve plug. The second gas pipeline connected to the first gas pipeline is connected to the second chamber. The third gas pipeline connects the first chamber with the second chamber. Both of the fourth gas pipeline and the first gas pipeline are connected with the first chamber. The cross-sectional area of the second gas pipeline is less than that of the third gas pipeline. The second control valve connected to the third gas pipeline controls the gas flow in the third gas pipeline. The first valve plug has a first position and a second position along the sliding direction. At the first position the first valve plug blocks the first gas pipeline to disconnect the first gas pipeline and the first chamber, and at the second position the first valve plug departs from the first gas pipeline to connect the first gas pipeline with the first chamber.

An air-jet system comprises a compressed air tank for storing compressed air, a distributor for transporting compressed air to the compressed air engine, and a pressure reducing gas storage device. The output of the compressed air tank is connected to an inlet of the pressure reducing gas storage device via a pipeline and the outlet of the pressure reducing gas storage device is connected to the distributor.

A motor vehicle comprises wheels, a drive train, a compressed air engine and an air-jet system. The air jet system, the compressed air engine, the drive train and the wheels are power connected in turn.

The present application has the following technical effects. When the applicant of this application tested a motor vehicle using a compressed air engine, he found that the power of the motor vehicle is usually insufficient after running a long time. In this case, the applicant had to stop testing and check each part of the motor vehicle, but he failed to find the malfunction until he once found that the air-jet nozzle was condensed and frozen so that it cannot normally eject gas. Based on an analysis of the above situation, the applicant further found that the pressure reducing valve is also easy to be frozen. As for this case, the phenomenon of being frozen is eliminated by providing a heat exchanger to heat the air input in the gas storage tank. In addition, by providing a cooler, the temperature of ambient air is reduced and energy is saved. By providing a heater, not only the working stability of compressed air is further improved, but also the heating of the motor vehicle is achieved.

BRIEF DESCRIPTION OF THE DRAWINGS

FIG. 3 is a schematic structural view showing the air pressure regulator of the motor vehicle at an open configuration.

FIG. 4 is a sectional view along the line A-A in FIG. 3.

DETAILED DESCRIPTION

Figure 1:
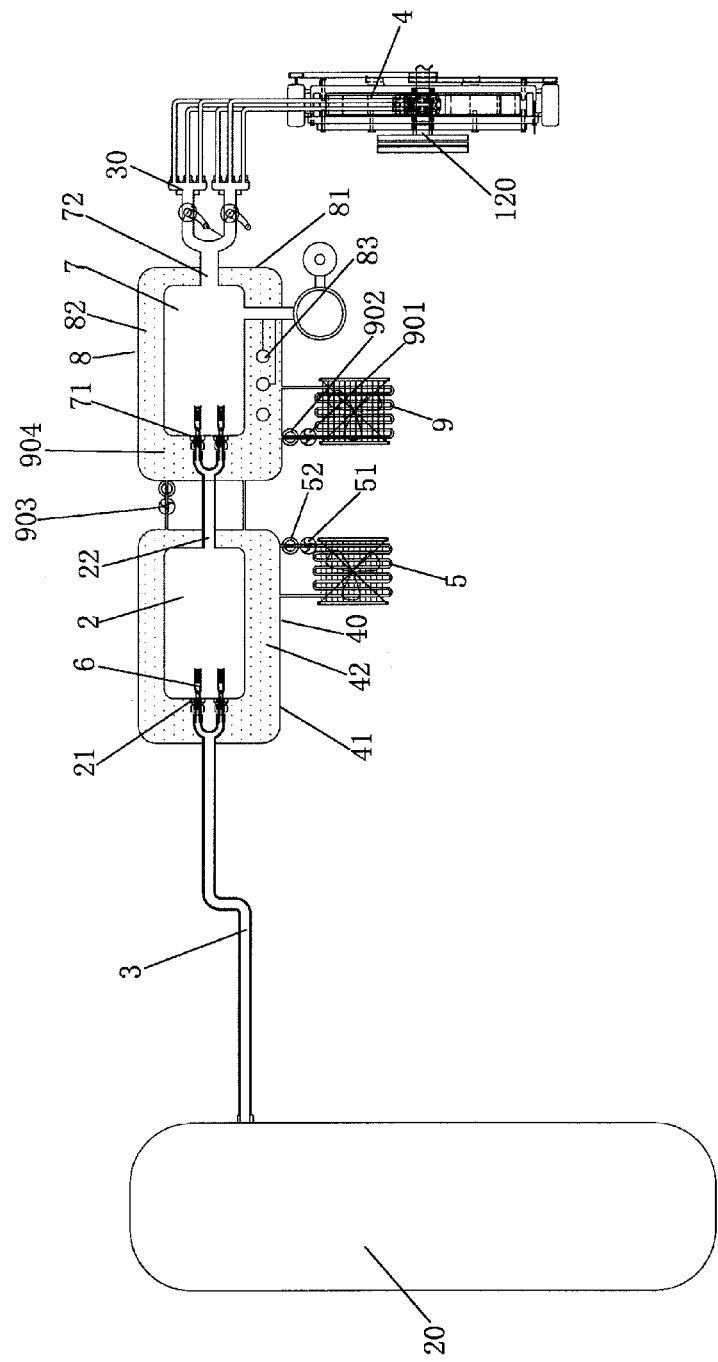
FIG. 1 is a schematic structural view showing the connection of a compressed air tank, an air-jet system and a compressed air engine of a motor vehicle.

As shown in FIG. 1 to FIG. 8, a motor vehicle according to this embodiment comprises an air-jet system, a compressed air engine 4, wind resistance engines 3, 3', a drive train 11 and wheels 123. The air-jet system has an air-jet nozzle 60 and the compressed air engine 4 has a primary power output shaft 120. The air-jet nozzle 60 of the air-jet system ejects gas to the compressed air engine 4. The compressed air engine 4 compresses gas and then expands gas so that the primary power output shaft 120 of the compressed air engine 4 is driven to rotate, which drives the wheels 123 to rotate via the drive train 11. The drive train 11 may comprise a gearbox 112, a universal transmission device 113 connected to the gearbox 112, and a drive axle 114 connected to the universal transmission device 113. A first clutch 56 is provided between the primary power output shaft 120 of the compressed air engine 4 and the drive train 11. The drive axle 114 is connected to the wheels 123.

As shown in FIG. 1 to FIG. 4, the air-jet system comprises a compressed air tank 20 for storing compressed air, a pressure reducing gas storage device, a distributor 30 and the air-jet nozzle 60. The output of the compressed air tank 20 is connected to an inlet of the pressure reducing gas storage device via a pipeline 3. The outlet of the pressure reducing gas storage device is connected to the air-jet nozzle 60 via the distributor 30. The distributor 30 is used to distribute the gas outputted by the pressure reducing gas storage device into multiple routes of gas, each of which is ejected by a corresponding air-jet nozzle 60. The pressure reducing gas storage device comprises a gas storage tank and a heat exchanger. The gas storage tank comprises a first air chamber 2 having a first inlet 21 and a first outlet 22. The first inlet 21 is used to input air and the first outlet 22 is used to output air. The two ends of the pipeline 3 are connected to the compressed air tank 20 and the first inlet 21 of the first air chamber 2, respectively. There may be provided one or more pipelines 3. The cross section area of the pipeline 3 is less than that of the compressed air tank 20 and less than that of the first air chamber 2. The heat exchanger comprises a first heat exchange unit 40 arranged on the first air chamber 2. The first heat exchange unit 40 comprises a first temperature regulation chamber 41 surrounding the first air chamber 2 and a first medium 42 filled between the first temperature regulation chamber 41 and the first air chamber 2. The first medium 42 may be liquid (for example, water) or gas or other heat exchangeable mediums. The temperature of the first medium 42 is higher than that of the gas within the first air chamber 2 so that the compressed air in the compressed air tank 20 is released into the first air chamber 2 via the pipeline 3 and then exchanges heat with the first medium 42. The heated air is output from the first outlet 22 of the first air chamber 2. The first air chamber 2 may be made of a material having good heat conduction property so as to facilitate the heat exchange of the air in the first air chamber 2 with the first medium 42. The first temperature regulation chamber 41 may be made of a material which is thermal insulation or has poor heat conduction property so that the heat is difficult to be dissipated into the ambient air.

The first heat exchange unit 40 is connected to a cooler 5. Each of the two ends of the cooler 5 is connected to the first temperature regulation chamber 41 to form a refrigeration cycle loop. The cooler 5 is provided with a first circulating pump 51 and a first circulating pump switch 52 for controlling the switch of the first circulating pump 51. The temperature of the first medium 42 in the first temperature regulation chamber 41 decreases after the first medium 42 exchanges heat with the air in the first air chamber 2. The first medium 42 of which the temperature is decreased circulates in the cooler 5 and the first temperature regulation chamber 41. A refrigeration air-conditioning circulates the ambient air to exchange heat with the cooler 5 so that the ambient air is cooled to achieve refrigeration effect.

The air output from the compressed air tank 20 is ejected via the air-jet nozzle 60 after it is heated by the first heat exchange unit 40 of the pressure reducing gas storage device so that condensation or even freeze will not be occurred at the air-jet nozzle 60 due to lower temperature. Meanwhile, the effect of decreasing the temperature of ambient air is achieved by connecting the first heat exchange unit 40 to the refrigeration air-conditioning and using the first medium 42 whose temperature has been decreased as circulating medium. Therefore, energy is saved.

Figure 2:
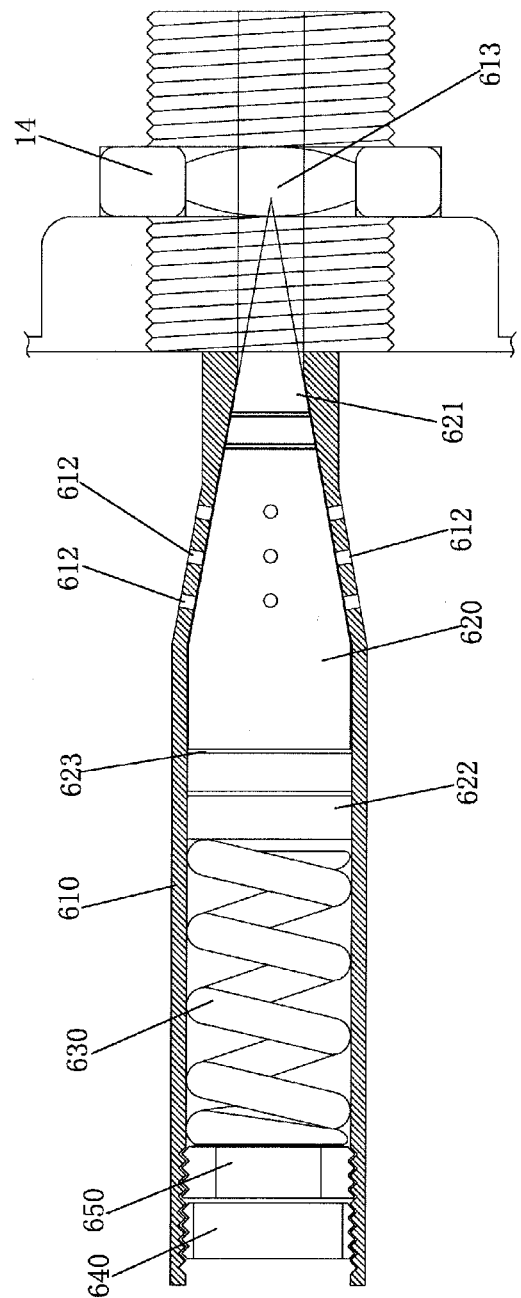
FIG. 2 is a schematic structural view showing the air pressure regulator of the motor vehicle at a close configuration.
Figure 5:
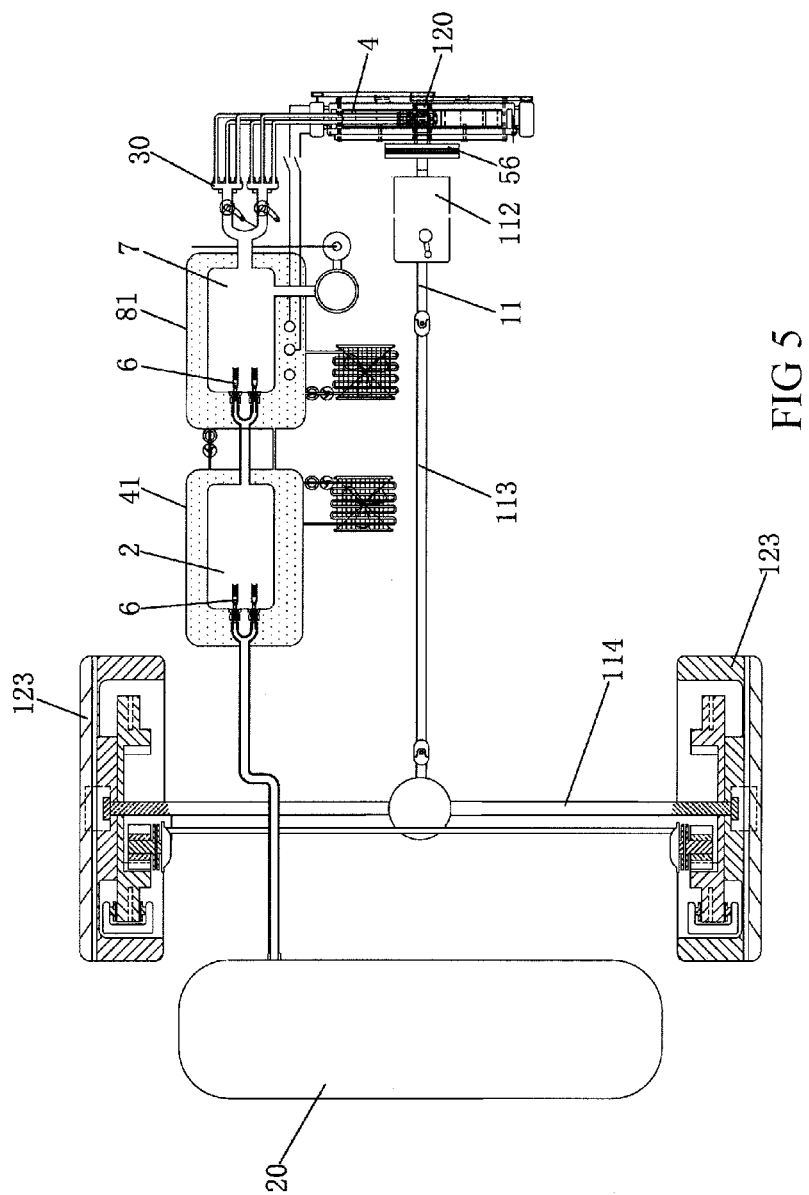
FIG. 5 is a schematic structural view of the motor vehicle (only two wheels are illustrated).

As shown in FIG. 2 to FIG. 4, the air-jet system may further comprise an air pressure regulator 6 for maintaining the air pressure in the first air chamber 2 at a predetermined value. The air pressure regulator 6 comprises a housing 610, a valve core 620, an elastic body 630, a locking block 640 and a regulating block 650. The housing 610 is mounted at the first inlet 21 of the first air chamber 2 via a fastener 14. The housing 610 is partly located within the first air chamber 2 and partly extends out of the first air chamber 2. The housing 610 has a housing cavity 611 axially running therethrough and an airway 612 radially running therethrough. The housing cavity 611 is in communication with an air intake pipe 613 which is in communication with the pipeline 3. The airway 612 is in communication with the first air chamber 2. The valve core 620 is located within the housing cavity 611 and sealingly and slidably fitted with the housing. Two ends of the valve core 620 in the axial direction of the housing 610 are a sealing end 621 and a regulation end 622. The sealing end 621 may seal the airway 612 and the air intake pipe 613. The elastic body 630 may be capable of deforming expansively along the axial direction of the housing 610. Two ends of the elastic body 630 bear against the regulation end 622 of the valve core 620 and the regulating block 650, respectively. The regulating block 650 is thread connected to the housing 610, and the locking block 640 is thread connected to the housing 610 and presses the regulating block 650 against the elastic body 630. The regulating block 650 and the locking block 640 have axially running through first and second lead holes 651, 641, respectively. The first and second lead holes 651, 641 communicate with each other to guide gas into the housing cavity 611 and onto the regulation end 622 of the valve core 620. The diameter of the first lead hole 651 is less than that of the second lead hole 641. The sealing end 621 of the valve core is in the form of truncated cone, and an elastic sealing ring 623 is fixed on the contour surface of the sealing end 621. An elastic sealing ring 623 is also fixed on the contour surface of the regulation end of the valve core. On the section perpendicular to the axis of the housing 610, the cross section area of the sealing end 621 of the valve core is less than that of the regulation end 622. The pressure applied on the sealing end 621 includes the air pressure of the air input from the pipeline 3, and the pressure applied on the regulation end 622 includes the air pressure of the air in the first air chamber 2 and the elastic force of the elastic body 630. The elastic body is for example a spring, or other components capable of deforming expansively along the axis direction of the housing 610.

The working principle of the air pressure regulator is described below. When the air pressure of the gas input via the pipeline 3 is stable, a pressure reducing passage 614 is formed between the valve core 620 and the housing 610 so that the gas in the pipeline 3 can enter the first air chamber 2 through the pressure reducing passage 614 and the airway 612. When the air pressure of the gas input via the pipeline 3 is higher than a predetermined value, the air pressure of the input gas pushes the valve core 620 to move toward the side of the regulation end 622, and thereby the volume of the pressure reducing passage 614 increases and the air pressure in the first air chamber 2 decreases. When the air pressure of the gas input via the pipeline 3 is lower than the predetermined value, the force applied to the regulation end 622 is larger than that applied to the sealing end 621 so that the valve core moves toward the side of the sealing end 621, and thereby the volume of the pressure reducing passage 614 decreases and the air pressure in the first air chamber 2 increases. When the air pressure of the gas input via the pipeline 3 changes, the valve core moves linearly according to the variation of the forces applied to the sealing end 621 and the regulation end 622 so as to stabilize the air pressure in the first air chamber 2 at a predetermined air pressure. When the air pressure regulator is turned off, the sealing end 621 blocks the airway 612 and the air intake pipe 613 and the gas in the pipeline 3 cannot enter the first air chamber 2. The air pressure of the gas outputted by the pressure reducing gas storage device can be stabilized at a predetermined air pressure by providing the air pressure regulator.

The prestressing force of the elastic body 630 may be adjusted by screwing or unscrewing the regulation block 640 so that the initially set air pressure of the air pressure regulator may be changed.

The pressure reducing gas storage device may further comprise a second air chamber 7 and a second heat exchange unit 8. In the direction of airflow, the first air chamber 2 is in front of the second air chamber 7. The second air chamber 7 has a second inlet 71 and a second outlet 72. The second inlet 71 is connected to the first outlet 22 of the first air chamber 2. The second heat exchange unit 8 comprises a second temperature regulation chamber 81 surrounding the second air chamber 7, a second medium 82 such as liquid or gas filled between the second temperature regulation chamber 81 and the second air chamber 7, and a heater 83 for heating the second medium 82. The heater 83 is for example, a solar energy heater, electrical heater, microwave heater or other heaters capable of heating a medium. There can be provided one or more heaters and there also can be provided one or more kinds of heaters. The second temperature regulation chamber 81 is connected to a radiator 9 of a heating air-conditioning to form a heating cycle loop. The radiator 9 is provided with a second circulating pump 901 and a second circulating pump switch 902 for controlling the switch of the second circulating pump 901. The heated second medium 82 circulates within the second temperature regulation chamber 81 and the radiator 9. The heating air-conditioning circulates ambient air to exchange heat with the radiator 9 so that the temperature of ambient air increases to achieve the effect of heating. The air may be further heated by the second heat exchange unit 8 after being heated by the first heat exchange unit 40, so that it is more difficult to condense or even freeze the air-jet nozzle of the air-jet system. The second inlet 71 of the second air chamber 7 may also be provided with a pressure reducing valve 6.

In addition, the first temperature regulation chamber 41 and the second temperature regulation chamber 81 are connected via a pipeline to form a cycle loop. This cycle loop is provided with a third circulating pump 903 and a third circulating pump switch 904 for controlling the switch of the third circulating pump 903.

The heat exchanger may only comprise a first heat exchange unit which heats air in an air storage tank by means of heat exchange. There can be provided one or more first heat exchange units. The heat exchanger may also only comprise a second heat exchange unit having a heater. There can be provided one or more second heat exchange units. The heat exchanger may also comprise both of the first and second heat exchange units. When the first heat exchange unit is used, not only air may be heated, but also the cooled first medium may be used as medium to reduce the temperature in the motor vehicle. When the second heat exchange unit is used, the heated second medium may be used as medium to increase the temperature in the motor vehicle.

Figure 6:
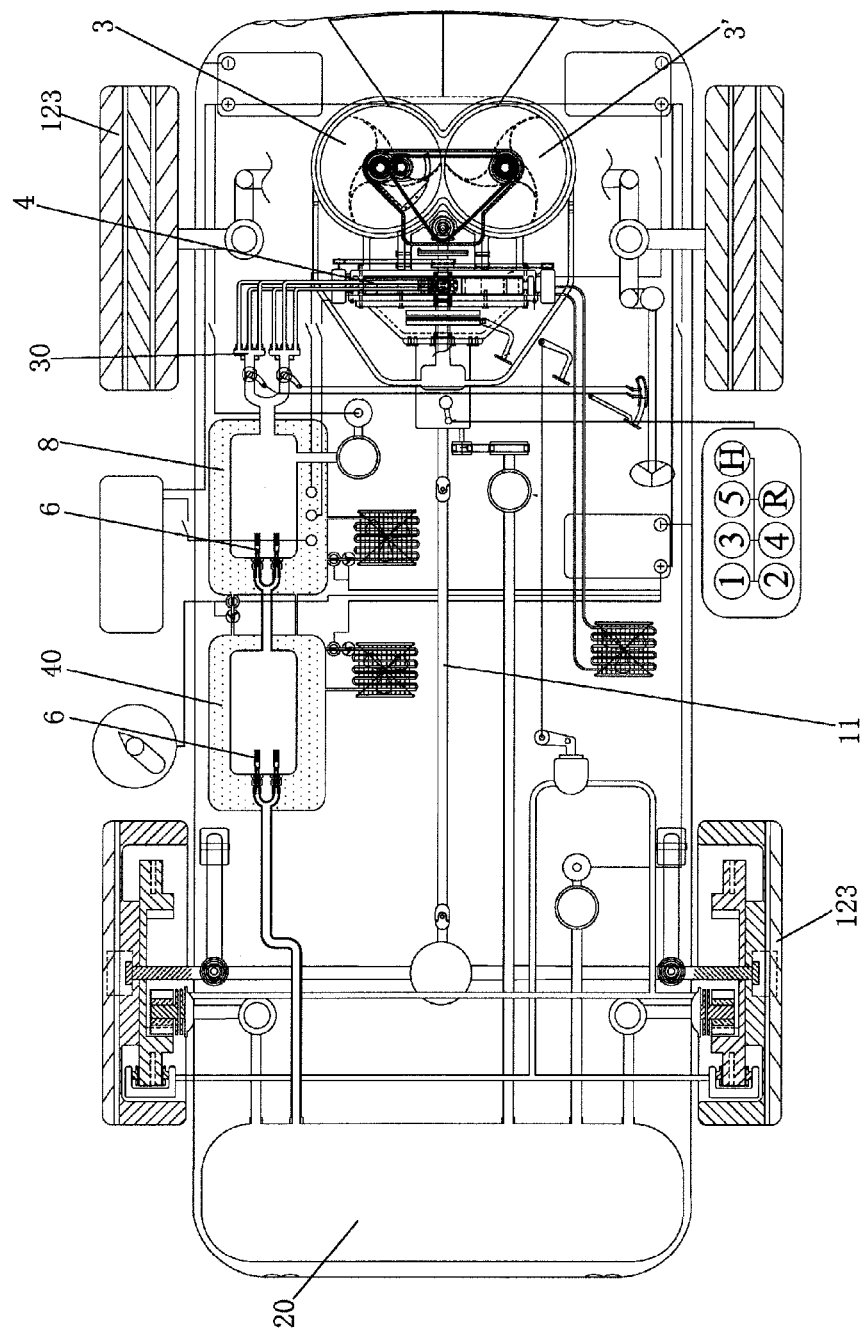
FIG. 6 is a top schematic view of the motor vehicle.
Figure 7:
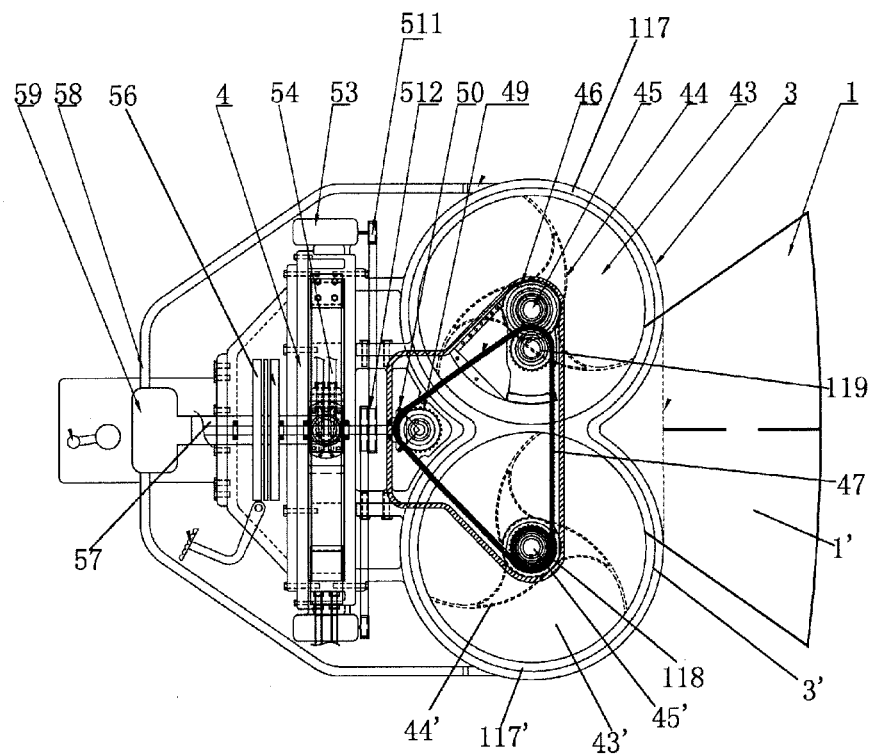
FIG. 7 is a top schematic view showing a wind resistance engine and a compressed air engine assembled together.
Figure 8:
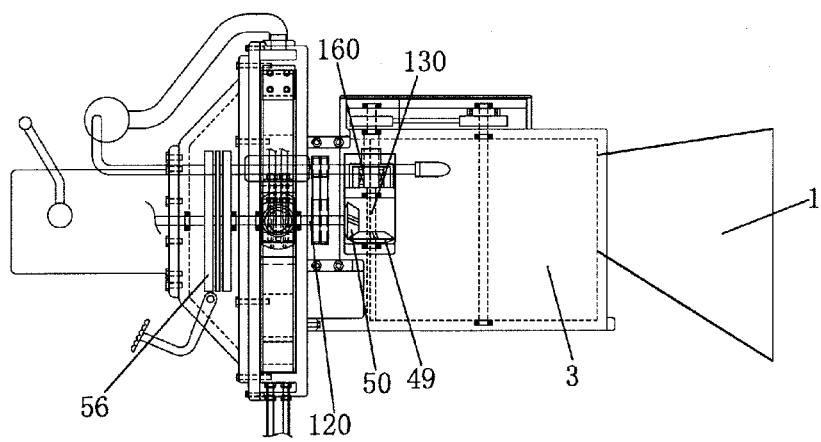
FIG. 8 is a front schematic view showing the wind resistance engine and the compressed air engine assembled together.
Figure 9:
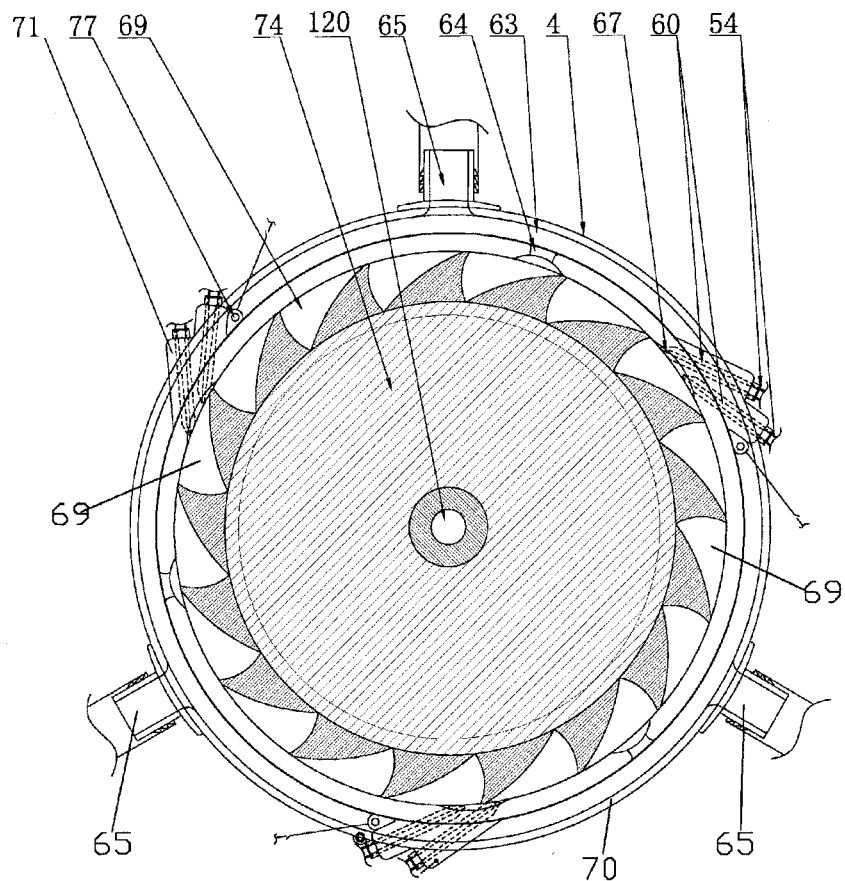
FIG. 9 is a front schematic view of a compressed air engine of the motor vehicle.
Figure 10:
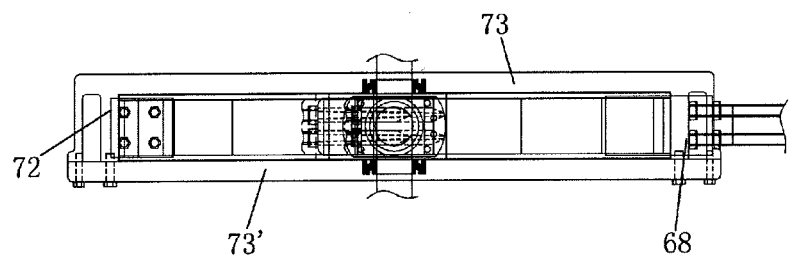
FIG. 10 is a top schematic view of the compressed air engine of the motor vehicle.

As shown in FIG. 6 to FIG. 8, there are provided two wind resistance engines arranged symmetrically, namely, a first wind resistance engine 3 and a second wind resistance engine 3'. The first wind resistance engine comprises a first casing 117, a first impeller chamber 43 enclosed by the first casing 117, a plurality of first impellers 44 and a first impeller shaft 45. Each of the first impellers 44 is fixed on the first impeller shaft 45 and located within the first impeller chamber 43. The first casing 117 is provided with a first air intake 1 for receiving front resistance fluid during the running of the motor vehicle. The first air intake 1 has an external opening and an inner opening. The caliber of the external opening is larger than that of the inner opening. The first air intake 1 communicates with the first impeller chamber 43. The resistance fluid is directed into the first impeller chamber 43 via the first air intake 1 to drive the first impellers 44 and the first impeller shaft 45 to rotate. Auxiliary power is output via the first impeller shaft 45. The second wind resistance engine 3' comprises a second casing 117', a second impeller chamber 43', a second impeller 44', a second impeller shaft 45' and a second air intake 1' for receiving resistance fluid. The first impeller chamber 43 and the second impeller chamber 43' are arranged independently and do not communicate with each other. The first impeller shaft 45 is parallel with the second impeller shaft 45' and rotates in an opposite direction to the second impeller shaft 45'. A first transfer gear 46 is fixed on the first impeller shaft 45 and a second transfer gear 118 is fixed on the second impeller shaft 45'. The motor vehicle further comprises a first reversing device, a second reversing device and an auxiliary power output shaft. The first reversing device comprises a reversing gear 119 and a transmission belt 47 and the second reversing device comprises a first drive conical gear 49 and a second drive conical gear 50. The first drive conical gear 49 engages with the second drive conical gear 50 and the axis of the first drive conical gear 49 is perpendicular to that of the second drive conical gear 50. The reversing gear 119 engages with the first transfer gear 46 and the axis of the reversing gear 119 is parallel with that of the first transfer gear 46. The transmission belt 47 is wound around the first drive conical gear 49, the second transfer gear 118 and the reversing gear 119 which are arranged triangularly. The first drive conical gear 49 is fixed on an auxiliary power output shaft 130. The power outputted by the first impeller shaft 45 and the second impeller shaft 45' is switched onto the auxiliary power output shaft 130 via the first reversing device, and the power outputted by the auxiliary power output shaft 130 is switched to the drive train 11 of the motor vehicle via the second reversing device. There may be two, one or more than two wind resistance engines. A plurality of impellers fixed on the impeller shafts are mounted in the impeller chamber of the wind resistance engine and the impellers and impeller shafts are driven to rotate by the resistance fluid.

Figure 11:
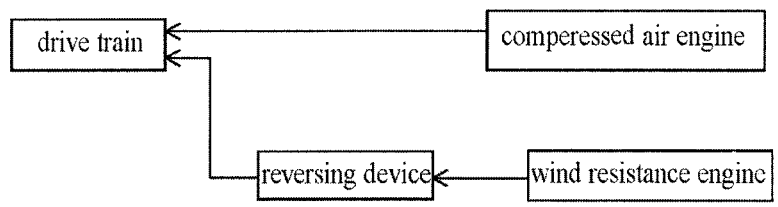
FIG. 11 and FIG. 12 are schematic diagrams respectively illustrating a wind resistance engine and a compressed air engine connected in parallel and in series.
Figure 12:
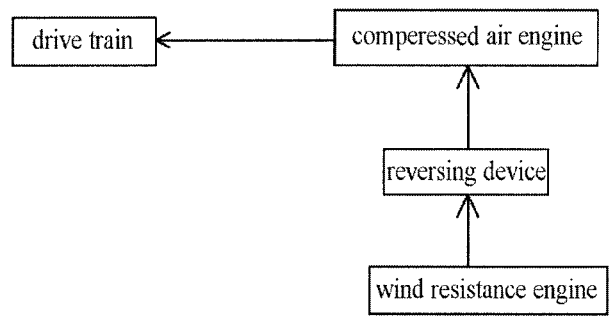

After the power outputted by the impeller shafts of the wind resistance engine is reversed via the reversing device, it may directly drive the drive train of the motor vehicle, as shown in FIG. 11, and it may also be connected in series with the primary power output shaft of the compressed air engine to drive the drive train of the motor vehicle, as shown in FIG. 12.

As shown in FIG. 6 to FIG. 8, The compressed air engine 4 is arranged to be independent of the first and second wind resistance engines 3, 3' and located at the back of the first and second wind resistance engines 3, 3'. The compressed air engine 4 has the primary power output shaft 120 and the second transfer gear 50 is fixed at the end of the primary power output shaft 120. With the first and second drive conical gears 49, 50 which are vertically engaged with each other, the power, which is outputted by the first and second wind resistance engines 3, 3', is reversed vertically and outputted to the primary power output shaft 120 of the compressed air engine.

The motor vehicle is provided with a first clutch 160 via which the power outputted by the first and second wind resistance engines 3, 3' is output to the auxiliary power output shaft 130, as shown in FIG. 8. During the starting stage of the motor vehicle, the wind resistance engine does not output power and the first clutch 160 disengages so that the auxiliary power output shaft 130 would not be rotated with the primary power output shaft 120, thus reducing the starting load of the motor vehicle. During the normal running of the motor vehicle, the first clutch 160 engages, the power outputted by the auxiliary power output shaft 130 and that outputted by the primary power output shaft 120 together drive the drive train 11 of the motor vehicle. The first clutch 160 may be for example a prior art one-way clutch, overrunning clutch, etc, and of course may also be other clutches having disengaging and engaging states.

As shown in FIG. 6 to FIG. 10, the compressed air engine 4 further comprises a housing and a round impeller body 74 located within the housing 70. The housing comprises an annular side casing 72, an upper cover plate 73 and a lower cover plate 73'. The upper cover plate 73 and lower cover plate 73' are respectively fixed at the upper and lower openings of the annular side casing 72 so that the annular side casing 72, the upper cover plate 73 and lower cover plate 73' form a closed impeller body chamber 68. The impeller body 74 is located within the impeller body chamber 68 and the central portion of the impeller body 74 is fitted on the primary power output shaft 120. By notching on the circumference surface of the impeller body 74 which joints with the inner surface of the side casing 72, a set of working chambers 69 are formed and distributed evenly around the axis of the primary power output shaft 120. On the section perpendicular to the axis of the primary power output shaft 120, the working chamber 69 takes a form of a triangle formed by three curves connected end to end. There may be one or more sets of working chambers 69. The working chambers may be a thorough-slot structure axially running through on the impeller body. The inner surfaces of the upper cover plate, the lower cover plate and the side casing close the working chamber. The working chambers may also be of a non-thorough-slot structure provided in the middle of the circumference surface of the impeller body and the inner surface of the side casing closes the working chambers. Of course, the working chamber may also be closed by the inner surfaces of the upper cover plate and the lower cover plate, or by the inner surfaces of the lower cover plate and the side casing. That is to say, the working chambers are closed by the inner surface of the casing.

The inner surface of the side casing 72 is also provided with a plurality of ejecting inlets 67 and a plurality of ejecting outlets 64. The ejecting inlets 67 and ejecting outlets 64 are arranged alternately. An annular first-order silencer chamber 63 is also provided within the side casing 72. A plurality of first-order exhaust ports 65 are provided on the external surface of the side casing 72, and each of the ejecting outlets 64 has a corresponding first-order exhaust port 65. The ejecting outlets 64 communicate with the first-order exhaust ports 65 via the first-order silencer chamber 63. The ejecting inlets 67 communicates with none of the ejecting outlets 64, the first-order exhaust port 65 and the first-order silencer chamber 63. The ejecting outlets 64 and their corresponding first-order exhaust port 65 are spaced at an angle on the circumference centered on the axis of the primary power output shaft 120. An air-jet nozzle seat 71 is fixed on the position corresponding to each of the ejecting inlets 67 on the side casing 72. Each air-jet nozzle seat 71 is fixed with two air-jet nozzles 60. Each of the air-jet nozzles 60 extends into the corresponding ejecting inlet 67 and is connected to a gas ejecting pipe 54, and the axes of the two air-jet nozzles 60 on each of the ejecting inlets 67 form an acute angle. The compressed air in the compressed air tank 20 is transferred into the working chambers 69 via the gas ejecting pipe 54 and the air-jet nozzle 60. For each working chamber 69, the air ejected by the air-jet nozzle 60 drives the impeller body 74 to rotate and is compressed to be temporarily stored in the working chambers 69. When moving to the ejecting outlets 64, the temporarily stored gas in the working chamber 69 expands and jets out from the ejecting outlets 64 at a high speed. The reaction force formed when the gas is ejected again drives the impeller body 74 to rotate. When the impeller body 74 rotates, the primary power output shaft 120 is driven to rotate, which further drives the drive train 11 of the motor vehicle.

Figure 13:
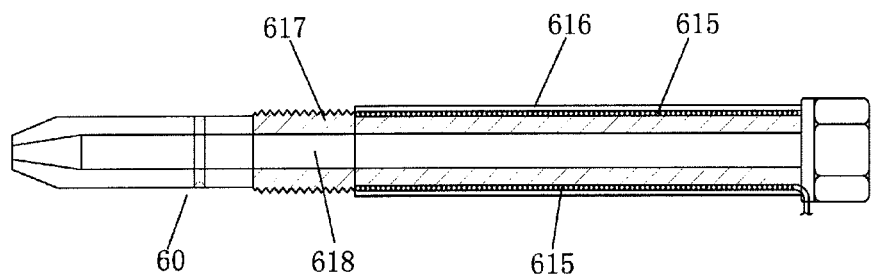
FIG. 13 is a schematic structural view of a nozzle.

For each working chamber 69, it takes a period of time from receiving the gas ejected by the air-jet nozzle 60 to ejecting the gas from the ejecting outlets 64. During the period of time, the gas is compressed and temporarily stored in the working chamber 69 so that the reaction force formed when the gas is ejected is larger and thus more power can be provided for the motor vehicle. Since the working chamber 69 is closed by the inner surface of the housing, it facilitates the compression and temporary storage of the compressed gas. In addition, in order to prevent the compressed gas from being condensed when being input to the compressed air engine, the air-jet nozzle seat 71 may be provided with a first heater 77 for heating the air-jet nozzle 60. The first heater 77 may be an electrically heated wire which is embedded in the air-jet nozzle seat 71. As shown in FIG. 13, the air-jet nozzle 60 comprises an air-jet nozzle body 617 having an axially running through cavity 618. The air-jet nozzle body 617 is provided with a second heater 615. The second heater 615 is an electrically heated wire which is wounded around the air-jet nozzle body 617. The air-jet nozzle body is also provided with a heat insulation layer 616. The second heater 615 is located between the heat insulation layer 616 and the air-jet nozzle body 617. The first and second heaters may be selected from a group consisting of an electrical heater, a microwave heater and a solar energy heater.

The motor vehicle further comprises a first electromotor 53 which is power connected with the primary power output shaft 120 of the compressed air engine 4 via a belt transmission mechanism 51. The belt transmission mechanism 51 comprises a pulley 511 and a belt 512 wounded around the pulley 511.

As shown in FIG. 6 to FIG. 8, the motor vehicle further comprises a compressed air reuse system for communicating the first-order exhaust ports 65 of the compressed air engine with the impeller chambers 43, 43' of the wind resistance engines. The compressed air reuse system comprises a first-order exhaust pipe 57, a second-order silencer chamber 59 and a second-order exhaust pipe 58. The inlets of the first-order exhaust pipe 57 communicate with the first-order exhaust ports 65, respectively, and the outlets of the first-order exhaust pipe 57 are gathered to the second-order silencer chamber 59. The second-order silencer chamber 59 communicates with the inlets of the second-order exhaust pipe 58. The outlets of the second-order exhaust pipe 58 communicate with both of the first impeller chamber 43 and the second impeller chamber 43'. The gas ejected at a high speed from the ejecting outlets 64 of the compressed air engine passes through the first-order silencer chamber 63 and the first-order exhaust port 65 in turn, then enters the first-order exhaust pipe 57 and after being silenced by the second-order silencer chamber 59, finally enters the first and second impeller chambers 43, 43' to drive the first and second impellers to rotate so as to reuse the compressed air. Accordingly, energy can be saved effectively and the driving force of the motor vehicle can be further improved.

Figure 14:
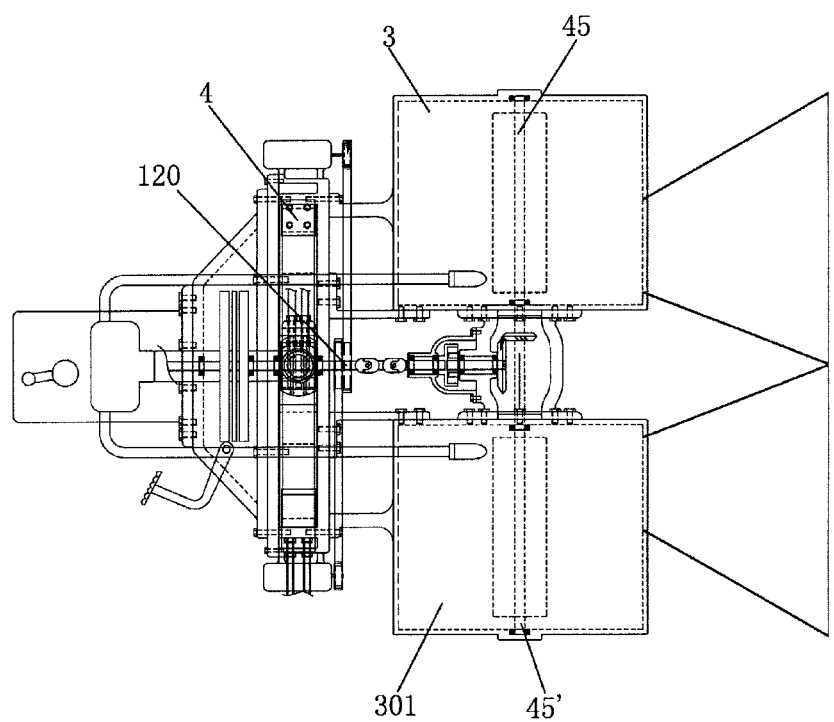
FIG. 14 is a top view of a motor vehicle according to a second embodiment.

FIG. 14 illustrates a second embodiment of the motor vehicle, which differs from the first embodiment mainly in that the first and second wind resistance engines 3, 3' are of horizontal type mounting and the first and second impeller shafts 45, 45' are mounted horizontally and perpendicular to the primary power output shaft 120. In the first embodiment, the first and second wind resistance engines 3, 3' are of vertical type mounting and the first and second impeller shafts 45, 45' are mounted vertically, as shown in FIG. 8. As for the second embodiment, although the power outputted by the first and second impeller shafts of the first and second wind resistance engines is converted to be coaxially output after being firstly reversed, it cannot be directly transferred to the drive train since the rotation direction of the coaxial output is perpendicular to that required by the drive train. It is necessary to use a second reversing device to convert the power outputted by the first and second wind resistance engines to the rotation direction which is identical to the rotation direction of the drive train.

Figure 15:
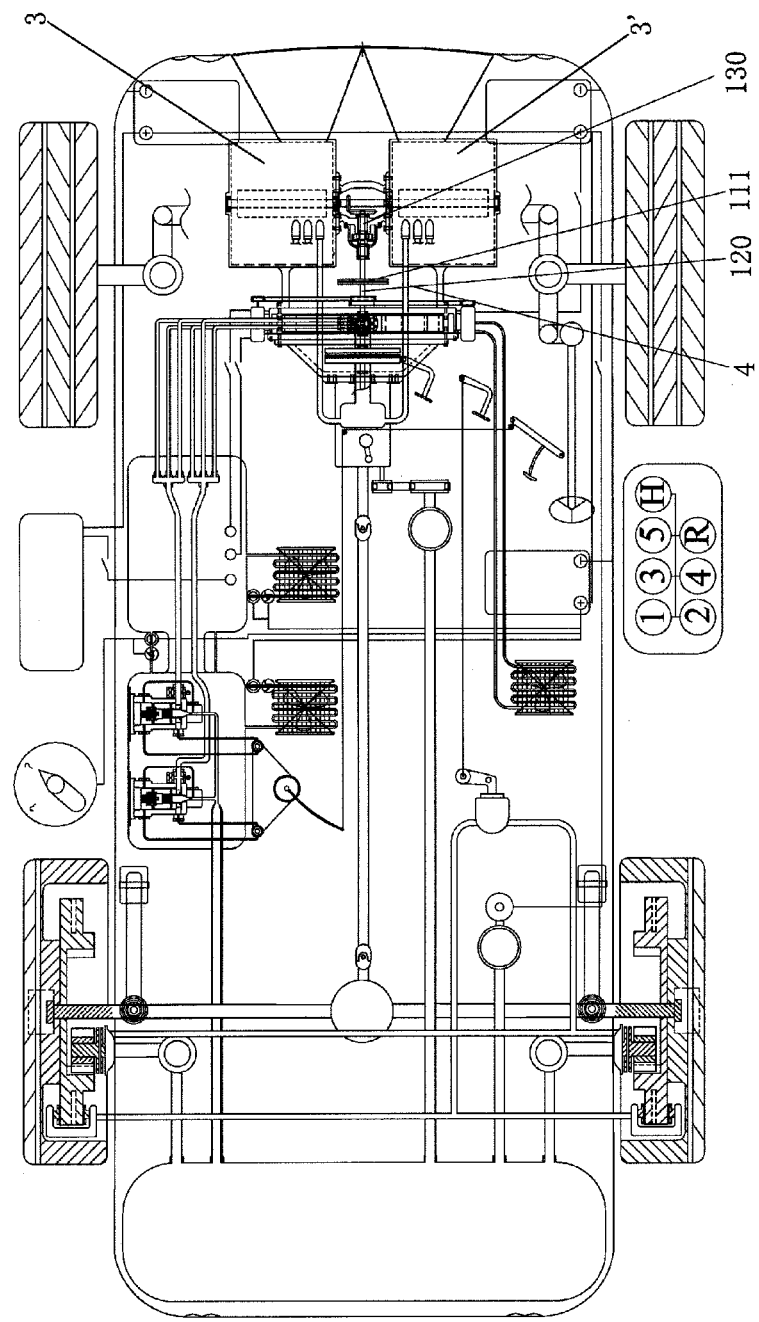
FIG. 15 is a top view of a motor vehicle according to a third embodiment.

FIG. 15 illustrates a third embodiment of the motor vehicle, which differs from the first embodiment mainly in that a second clutch 111 is provided between the auxiliary power output shaft 130 commonly used by both of the first and second wind resistance engines 3, 3' and the primary power output shaft 120 of the compressed air engine 4. The power connection or disconnection of the wind resistance engines and the wind resistance engine may be performed by the second clutch 111. The wind resistance engines according to this embodiment are of horizontal type mounting.

As shown in FIG. 16 to FIG. 19, a pressure reducing valve 40 is arranged between the distributor 30 and the compressed air tank 20 of the motor vehicle. The pressure reducing valve 40 comprises a first control valve 300 and a second control valve 400. The first control valve 300 comprises a first valve seat 301, a first valve plug 302 and an elastic body 303. The first valve seat 301 has a cavity 304. The first valve plug 302 is arranged in the cavity 304 and is slidably and sealingly fitted with the first valve seat 301. The first valve plug 302 is located in the cavity 304 and divides the cavity 304 into a first chamber 305 and a second chamber 306. The first control valve 300 further comprises a first gas pipeline 307, a second gas pipeline 308, a third gas pipeline 309 and a fourth gas pipeline 310. The first gas pipeline 307 is used to receive the compressed air input from the compressed air tank 20. The second gas pipeline 308 communicates at one end with the first gas pipeline 307, and at the other end with the second chamber 306. The third gas pipeline 309 communicates at one end with the second chamber 306, and at the other end with the first chamber 305. The first chamber 305 is connected to the distributor 30 via the fourth gas pipeline 310. The first gas pipeline 307 has a diameter greater than that of the second gas pipeline 308 and that of the third gas pipeline 309, and the second gas pipeline 308 has a diameter less than that of the third gas pipeline 309. The first valve plug 302 has a close position and an open position with respect to the first valve seat 301. When the first valve plug 302 is at the close position, it blocks the junction between the first gas pipeline 307 and the first chamber 305, so that the first gas pipeline 307 is disconnected from the first chamber 305; and when the first valve plug 302 is at the open position, it is apart from the junction between the first gas pipeline 307 and the first chamber 305 so that the first gas pipeline 307 communicates with the first chamber 305.

The first valve plug 302 comprises a columnar main body 311 and a closing portion 312 with a less diameter than that of the main body 311 and having a needle-shaped head. The main body 311 is slidably fitted with the first valve seat 301. The periphery surface of the main body 311 is surrounded by a first elastic sealing ring 316, through which the main body 311 is sealingly fitted with the first valve seat 301. The main body 311 has an axially running through inner chamber 317 in which the closing portion 312 extending into the chamber 305 is disposed and linearly movable with respect to the main body 311. The elastic body 303 comprises a first elastic body 313 and a second elastic body 314. The first elastic body 313 is disposed in the inner chamber 317, with its two ends bearing against the closing portion 312 and a positioning block 315, respectively. The second elastic body 314 is disposed in the second chamber 306 and is fixed at one end to the bottom 301a of the first valve seat 301 and at another end to the positioning block 315. The positioning block 315 is fixed through thread fitting to the bottom of the inner chamber 317. A second elastic sealing ring 318 is fixed onto the top surface of the main body 311.

The second control valve 400 is disposed on the third gas pipeline 309 for controlling the gas flux in the third gas pipeline 309. The control on gas flux may comprise controlling changes between flow and non-flow as well as between large flow and small flow. The second control valve 400 comprises a second valve seat 401 and a second valve plug 402. The second valve plug 402 comprises a second main body 404 and a conical body 405 located at the front end of the second main body 404. The second valve seat 401 is provided with a gas passage 406 having a gas inlet 407 and a gas outlet 408, both of which are connected with the third gas pipeline 309. A control cavity 410 which is cone-shaped corresponding to the cone body is provided within the gas passage 406. The second main body 404 is thread fitted with the control cavity 410 so that a second gap 403 between the second main body 403 and the control cavity 410 can be adjusted through the thread, thereby a gas flux in the third gas pipeline 309 is controlled. It can be understood for the persons in the art that the second control valve 400 may be implemented by other conventional airflow control means. The second valve plug 402 is connected to the output port of a transmission mechanism 500, and the input port of the transmission mechanism 500 is coupled with a control switch of a motor vehicle. The transmission mechanism 500 comprises a second transmission mechanism 502 and a power connected first transmission mechanism 501 connecting the control switch with the second transmission mechanism 502. The second transmission mechanism 502, such as a belt transmission mechanism, comprises a driving pulley 503 and a driven pulley 504 having a less diameter than that of the driving pulley 503. A belt 505 is wound around the driving pulley 503 and the driven pulley 504. The first transmission mechanism 501 moves according to an operation of the control switch to drive the driving pulley 503 to rotate, which further drives the driven pulley 504 to rotate by means of the belt 505. The driven pulley 504 drives the second valve plug 402 to rotate, rendering the second valve plug 402 screwed or unscrewed with respect to the second valve seat 401. In other words, the regulation of the flux of the third gas pipeline is carried out by changing size of the second gap 403 between the first valve plug and the first valve seat. When the second gap 403 becomes zero, the second control valve 400 is closed, and the third gas pipeline 309 is disconnected.

When the compressed air does not enter the pressure reducing valve, the head of the closing portion 312 blocks the junction between the first gas pipeline 307 and the first chamber 305 under the elastic force of the first and second elastic body 313, 314. At this moment, there is a gap between the second sealing ring 318 and the top 301b of the first valve seat 301 (or the second sealing ring 318 has reached the top 301b). When the compressed air enters the pressure reducing valve, the compressed air aerates into the chamber 306 through the first gas pipeline 307 and the second gas pipeline 308. During aeration, if the control switch 7 is not turned on, the pressure of the second chamber 306 continues driving the first valve plug 302 to move toward the top 301b, allowing the head of the closing portion to block up the junction (a peripheral surface 320 of the closing portion 312 clings to the inner wall 321 of the first gas pipeline 307) stably, until the second sealing ring 318 bears against the top 301b (or the second sealing ring 318 presses against the top 301b after being elastically deformed). When the control switch 7 is turned on, the second valve plug 402 is unscrewed, allowing the third gas pipeline 309 to be unblocked, and gas in the second chamber 306 flows to the first chamber 305 through the third gas pipeline 309, rendering a reduction of the pressure in the second chamber 306. The pressure of the compressed air forces the closing portion 312 of the first valve plug 302 to leave the junction, allowing the compressed air to enter the distributor 30 through the first chamber 305 and the fourth gas pipeline 310. While the compressed air is entering the fourth gas pipeline 310 through the first chamber 305, the whole first valve plug 302 moves toward the bottom 301a of the first valve seat 301. When forces applied to the first valve plug 302 become equilibrium, the main body 311 and the closing portion 312 stay still with respect to each other. A first gap 319 for passage of the compressed air is then formed between the periphery surface 320 of the closing portion and the inner wall 321 of the first gas pipeline. While the compressed air tank stops supplying gas, the closing portion of the first valve plug blocks the junction between the first gas pipeline and the first chamber again under forces applied by the first and second elastic body, with the closing portion clinging to the inner wall of the first gas pipeline.

The flux and pressure of gas in the third gas pipeline may be regulated through operation of the second control valve, which makes the closing portion move up or down and leads to change of the first gap between the inner wall of the first gas pipeline and the periphery surface of the closing portion, thereby regulating the flux and pressure of gas in the fourth gas pipeline.

The first, second and third elastic bodies may be for example a spring, or an elastic sleeve, clips, or other components capable of deforming expansively or elastically along the sliding direction of the first valve plug.

With such a pressure reducing valve, compressed air in the compressed air tank is output to the distributor after the air pressure is regulated. The second elastic body 313 acts as a buffer effectively reducing a rigid strike force between the first valve plug 302 and the first valve seat 301, and meanwhile improving the air tightness provided by the closing portion 312 to the first gas pipeline 307. Since the second gas pipeline 308 has a cross section area less than that of the third gas pipeline 309, control on the whole gas path of the control valve 300 can be achieved, and meanwhile a flux can be amplified so as to improve precision of control.

Figure 19:
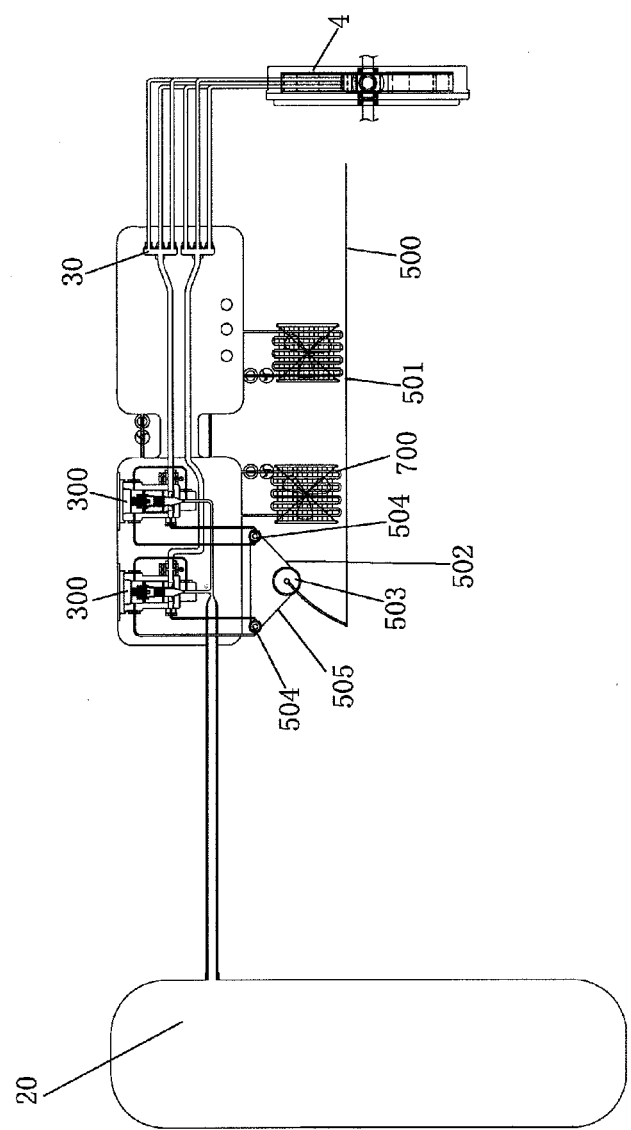
FIG. 19 is a schematic structural view illustrating a connection relationship among a flow reducing valve, a compressed air tank, a distributor and a transmission mechanism according to the fifth embodiment.
Figure 20:
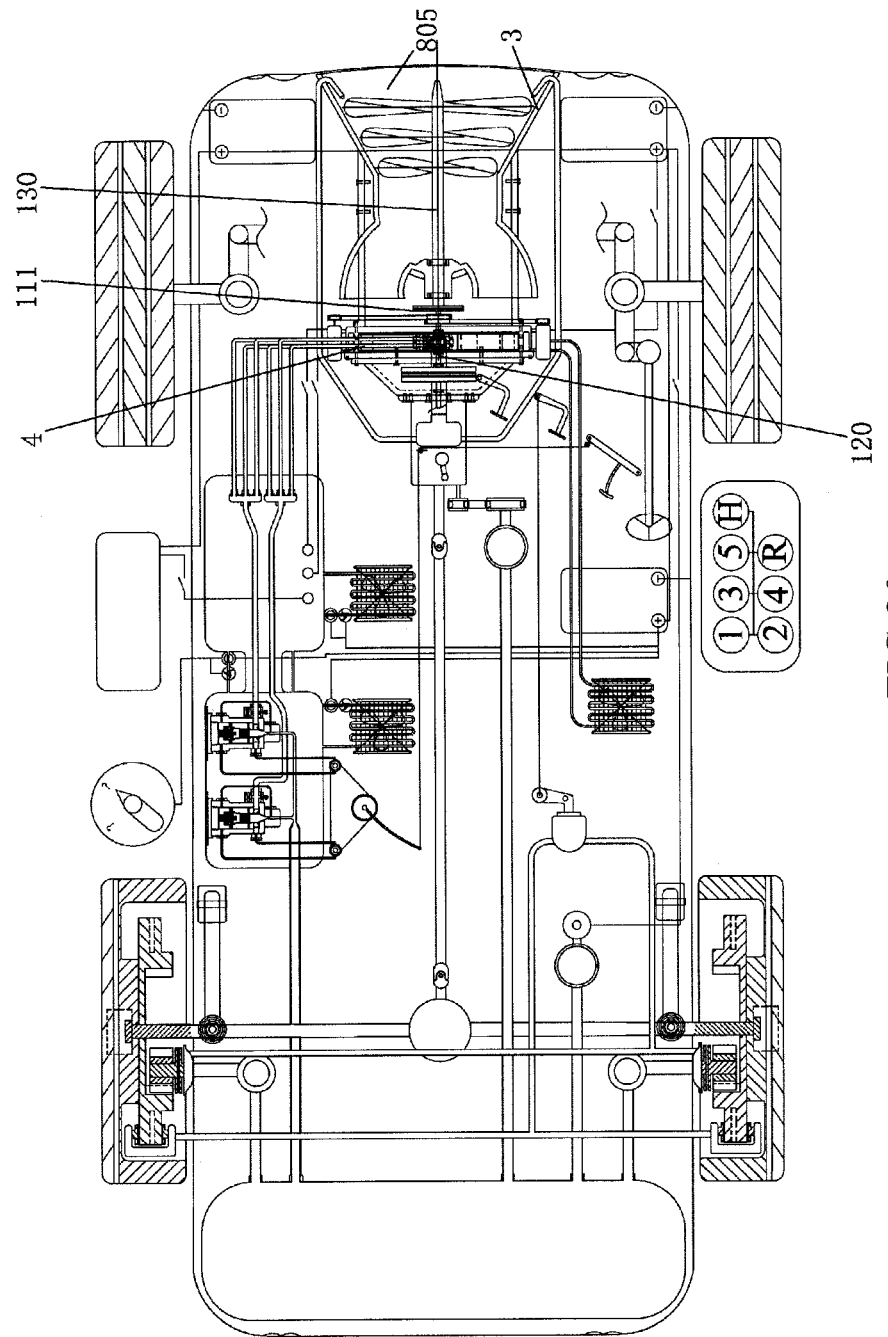
FIG. 20 is a top view of a motor vehicle utilizing another kind of wind resistance engine.
Figure 21:
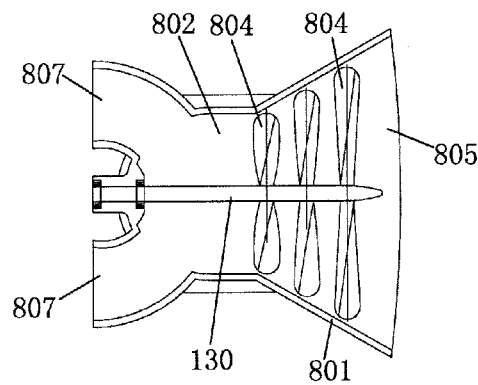
FIGS. 21-23 are front sectional view, side sectional view and top view of the wind resistance engine in FIG. 20.
Figure 22:
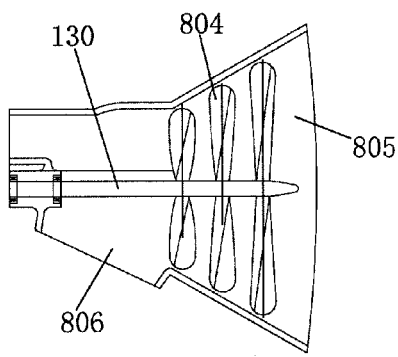
Figure 23:
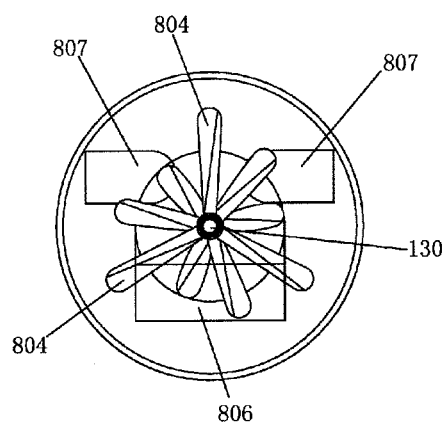

When two distributors are provided, two pressure reducing valves are provided corresponding to the two distributors and controlled by the same control switch. In this situation, as shown in FIG. 19, the second transmission mechanism comprises two driven pulleys separately driving the second valve plugs of the two pressure reducing valves. In other examples, more than two pressure reducing valves in series may be provided in order to achieve multistage control of the compressed air input to the gas distributor.

Figure 16:
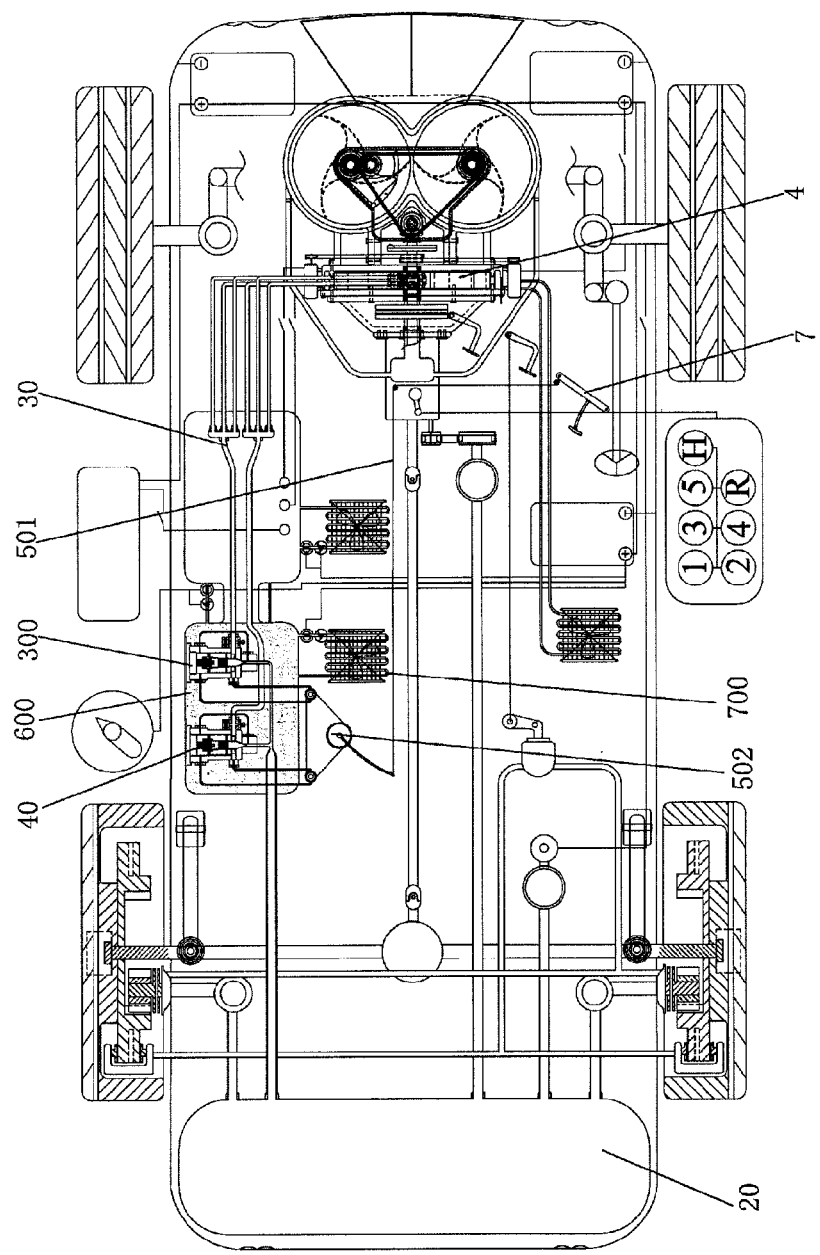
FIG. 16 is a top view of a motor vehicle according to a fourth embodiment.
Figure 17:
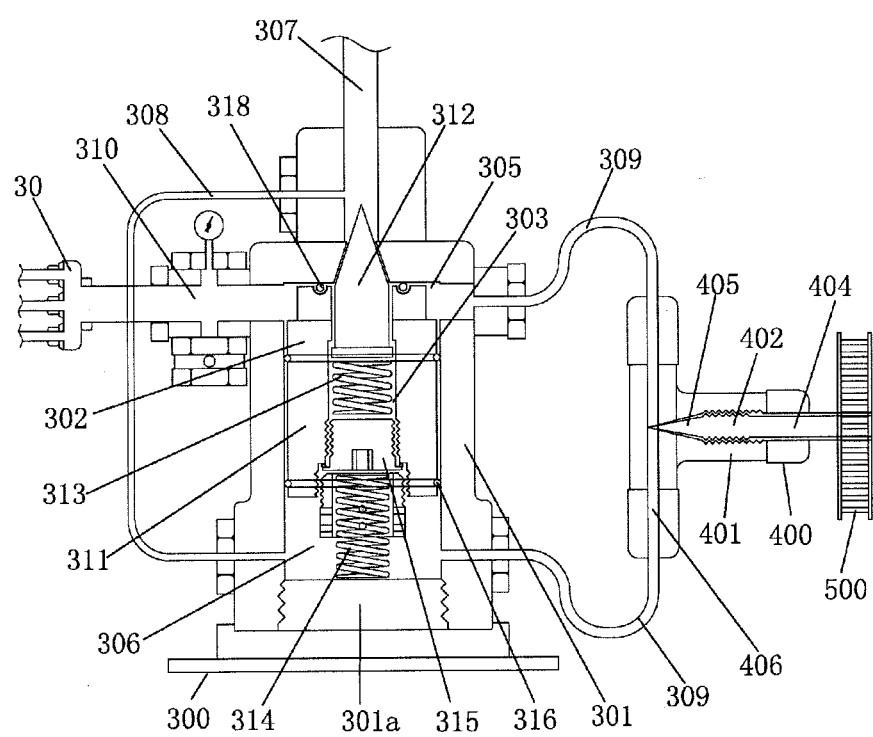
FIG. 17 is a schematic structural view showing a flow regulating valve being closed according to the fifth embodiment.
Figure 18:
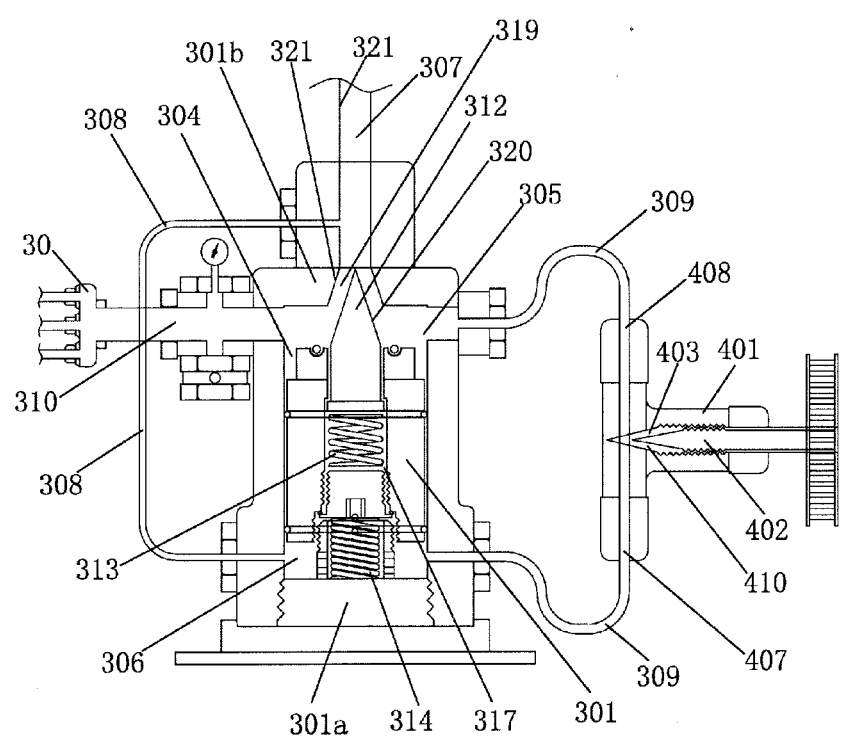
FIG. 18 is a schematic structural view showing a flow reducing valve being opened according to the fifth embodiment.

In addition, as shown in FIG. 16, the pressure reducing valve may be arranged wholly in heat exchange medium 600 which exchanges heat with the gas in the pressure reducing valve so that the gas is output via a distributor after being heated. The heat exchange medium 600 is used as the circulating medium of a cooler 700 of the refrigeration air-conditioning, and is cooled after being exchanged heat with the gas in the pressure reducing valve. The cooled heat exchange medium circulates in the cooler 5 so that the temperature of ambient air is reduced. The heat exchange medium may be for example antiseptic, un-volatile coolant with good cooling effect.

FIGS. 20-23 illustrate another embodiment of the wind resistance engine of the motor vehicle. The wind resistance engine 3 comprises a casing 801, an impeller chamber 802 enclosed by the casing 801, an auxiliary power output shaft 130 and a plurality of sets of impellers 804. Each set of impellers 804 at least comprises a plurality of impellers each of which is fixed on the auxiliary power output shaft 130 and the impellers are staggered. The impeller chamber 802 has an air intake 805 for receiving front resistance fluid generated when the motor vehicle is running. The air intake 805 is a trumpet-type inlet with a bigger external opening and a smaller internal opening. Each set of impellers 804 are located in the air intake 805 and the diameters thereof decrease in turn toward the interior of the air intake. The auxiliary power output shaft 130 is coaxial with the primary power output shaft 120 of the compressed air engine 4. A second clutch 111 is provided between the primary power output shaft 120 and the auxiliary power output shaft 130. In addition, the impeller chamber has one first exhaust port 806 and two second exhaust ports 807 arranged symmetrically. The first exhaust port 806 is located at the side of the casing 801 and at the back of the impellers 804. The air intake 805 is coaxial with the auxiliary power output shaft 130. The axis of the first exhaust port 806 forms an angle with that of the auxiliary power output shaft 130. The second exhaust ports 807 are located at the ends of the casing 801 and at the back of the impellers 804. The axis of the second exhaust port 807 forms an angle with that of the auxiliary power output shaft 130. The structure of the compressed air engine is to the same as that described previously.

In the starting stage, the second clutch 111 disengages and the primary power output shaft 120 disconnects from the auxiliary power output shaft 130. The compressed air engine 4 directly drives the drive train of the motor vehicle and does not need to drive the impellers of the wind resistance engine 3 to rotate so that the starting load is effectively reduced. When the motor vehicle is in motion, the third clutch engages and the primary power output shaft 120 is power connected to the auxiliary power output shaft 130. Each set of impellers is driven by external wind resistance airflow that the motor vehicle encounters to rotate, and the impellers drive the auxiliary power output shaft 130 to rotate. The power of the auxiliary power output shaft 130 is transferred to the drive train of the motor vehicle via the primary power output shaft 120.

Since the primary power output shaft 120 is coaxial with the auxiliary power output shaft 130, it is not necessary to reverse the power of the auxiliary power output shaft to output so that the structure is simplified, the power drive line is shortened and energy is saved. Since a plurality of sets of impellers 804 are used, the resistance fluid in front of the motor vehicle may be utilized more effectively.

A compressed air supply system comprises a compressed air tank, a pressure reducing valve, a heat exchanger and an output pipeline. The output of the compressed air tank is connected to the pressure reducing valve via the pipeline. The working gas, outputted by the pressure reducing valve where the gas pressure is reduced, enters the output pipeline. The heat exchanger which is used to heat the pressure reducing valve comprises a container filled with coolant, and the pressure reducing valve is arranged in the coolant. The compressed air supply system further comprises a cooler and a first circulating pump. The container, the cooler and the first circulating pump communicate with each other and use the coolant as medium to form a circulating cooling system. The system exchanges heat with ambient air through the cooler. The heat exchanger comprises a heater for heating the output pipeline. The compressed air supply system further comprises a radiator and a second circulating pump. The heater, the cooler and the second circulating pump communicate with each other to form a circulating radiation system. The system exchanges heat with ambient air through the radiator. A compressed air motor vehicle refrigeration system comprises a compressed air tank, a pressure reducing valve and a container filled with coolant. The working gas outputted by the pressure reducing valve where the pressure is reduced enters the output pipeline. The pressure reducing valve is arranged in the coolant. The container, the cooler and the first circulating pump communicate with each other and use the coolant as medium to form a circulating cooling system. The system exchanges heat with ambient air through the cooler. The pressure reducing valve may be the one as shown in FIGS. 2-4, FIG. 17 and FIG. 18.

Although the above description makes explanation in detail for the present application in reference to preferred embodiments, the practice of the present application should not be construed to be limited to these descriptions. A person skilled in the art can make various simple deductions or replacements without departing from the spirit and concept of the present application, which should be construed to fall into the scope of the appended claims of the present application.

What is claimed is:

1. A pressure reducing gas storage device comprising a gas storage tank and a first heat exchanger, a first cooler and a first circulating pump; wherein:
    the gas storage tank comprises an inlet for receiving compressed air and an outlet for outputting air;
    the first heat exchanger further comprises a first heat exchange unit filled with a first medium which exchanges heat with the air in the gas storage tank and the air in the air input so as to heat the air; and
    the first heat exchanger, the first cooler and the first circulating pump form an inner circulating cooling system, the first medium circulates within the first heat exchange unit and the first cooler, and the first cooler exchanges heat with ambient air.

2. The pressure reducing gas storage device according to claim 1, wherein the first heat exchange unit is provided with a first temperature regulation chamber surrounding the gas storage tank, the first medium is filled between the first temperature regulation chamber and the gas storage tank, both ends of the first cooler being connected to the temperature regulation chamber.

3. The pressure reducing gas storage device according to claim 1, wherein the first heat exchanger further comprises a second heat exchange unit, the inlet, the first heat exchange unit, the second heat exchange unit and the outlet are arranged in series, the second heat exchange unit is provided with a second temperature regulation chamber surrounding the gas storage tank, a second medium filled between the gas storage tank and the second temperature regulation chamber, and a first heater mounted at the second temperature regulation chamber for heating the second medium which exchanges heat with the air in the gas storage tank.

4. The pressure reducing gas storage device according to claim 3, wherein the second temperature regulation chamber is connected with a first radiator, the second medium circulates within the second temperature regulation chamber and the first radiator, the first radiator exchanges heat with ambient air.

5. The pressure reducing gas storage device according to claim 1, further comprising a pressure reducing valve, the compressed air enters the gas storage tank after its pressure is reduced by the pressure reducing valve.

6. The pressure reducing gas storage device according to claim 5, further comprising a second cooler and a second circulating pump, the second cooler and the second circulating pump communicate with each other and use a coolant as medium to form a circulating cooling system, the system exchanges heat with ambient air through the second cooler.

7. The pressure reducing gas storage device according to claim 5, wherein the pressure reducing valve comprises a housing provided with a housing cavity axially running therethrough and an airway radially running therethrough, a valve core located within the housing, an regulation block fixed with the housing, and an elastic body arranged between the regulation block and the regulation end of the valve core, wherein the valve core is sealingly and slidably fitted with the housing, the housing cavity is connected to an air intake pipeline by which the housing cavity is connected to the gas storage tank, the valve core is provided with a sealing end and a regulation end, the valve core has a first position and a second position, in the first position, the sealing end blocks the air intake pipeline to disconnect the air intake pipeline with the gas storage tank, and in the second position, the sealing end is apart from the air intake pipeline to connect the air intake pipeline with the gas storage tank.

8. The pressure reducing gas storage device according to claim 5, wherein the pressure reducing valve comprises a first control valve and a second valve, the first control valve comprises a first valve seat having a cavity, a first valve plug, a second elastic body, a first gas pipeline, a second gas pipeline, a third pipeline and a fourth pipeline, the first valve plug is arranged in the cavity and divides the cavity into a first chamber and a second chamber, the first valve plug is sealingly and slidably fitted with the first valve seat, the second elastic body is arranged in the second chamber and supports the first valve plug, the second gas pipeline connected to the first gas pipeline is connected to the second chamber, the third gas pipeline connects the first chamber with the second chamber, both of the fourth gas pipeline and the first gas pipeline are connected with the first chamber, the cross-sectional area of the second gas pipeline is less than that of the third gas pipeline, the second control valve connected to the third gas pipeline controls the gas flow in the third gas pipeline, the first valve plug has a first position and a second position along the sliding direction, at the first position the first valve plug blocks the first gas pipeline to disconnect the first gas pipeline and the first chamber, and at the second position the first valve plug departs from the first gas pipeline to connect the first gas pipeline with the first chamber.

9. An air-jet system comprising a compressed air tank for storing compressed air and a distributor for transporting compressed air to the compressed air engine, the air-jet system comprising;
    a pressure reducing gas storage device with a gas storage tank, a first cooler, a first circulating pump and a first heat exchanger; wherein:
    the gas storage tank comprises an inlet for receiving compressed air and an outlet for outputting air, the first heat exchanger comprises a first heat exchange unit filled with a first medium which exchanges heat with the air in the as storage tank and the air in the air input so as to heat the air, the output of the compressed air tank is connected to an inlet of the pressure reducing gas storage device via a pipeline, and the outlet of the pressure reducing gas storage device is connected to the distributor; and the first heat exchanger, the first cooler and the first circulating pump form an inner circulating cooling system, the first medium circulates within the first heat exchange unit and the first cooler, and the first cooler exchanges heat with ambient air.

10. The air-jet system according to claim 9, wherein the first heat exchange unit is provided with a first temperature regulation chamber surrounding the gas storage tank, the first medium is filled between the first temperature regulation chamber and the gas storage tank, both ends of the first cooler are connected to the temperature regulation chamber.

11. The air-jet system according to claim 9, wherein the first heat exchanger further comprises a second heat exchange unit, the inlet, the first heat exchange unit, the second heat exchange unit and the outlet are arranged in series, the second heat exchange unit is provided with a second temperature regulation chamber surrounding the gas storage tank, a second medium filled between the gas storage tank and the second temperature regulation chamber, and a first heater mounted at the second temperature regulation chamber for heating the second medium which exchanges heat with the air in the gas storage tank.

12. The air-jet system according to claim 11, wherein the second temperature regulation chamber is connected with a first radiator, the second medium circulates within the second temperature regulation chamber and the first radiator, the first radiator exchanges heat with ambient air.

13. The air-jet system according to claim 9, further comprising a pressure reducing valve, the compressed air enters the gas storage tank after its pressure is reduced by the pressure reducing valve.

14. A motor vehicle comprising wheels, a drive train, a compressed air engine and an air-jet system claimed by claim 9, wherein the air-jet system, the compressed air engine, the drive train and the wheels are power connected in series.

* * * * *